June 30, 1925.

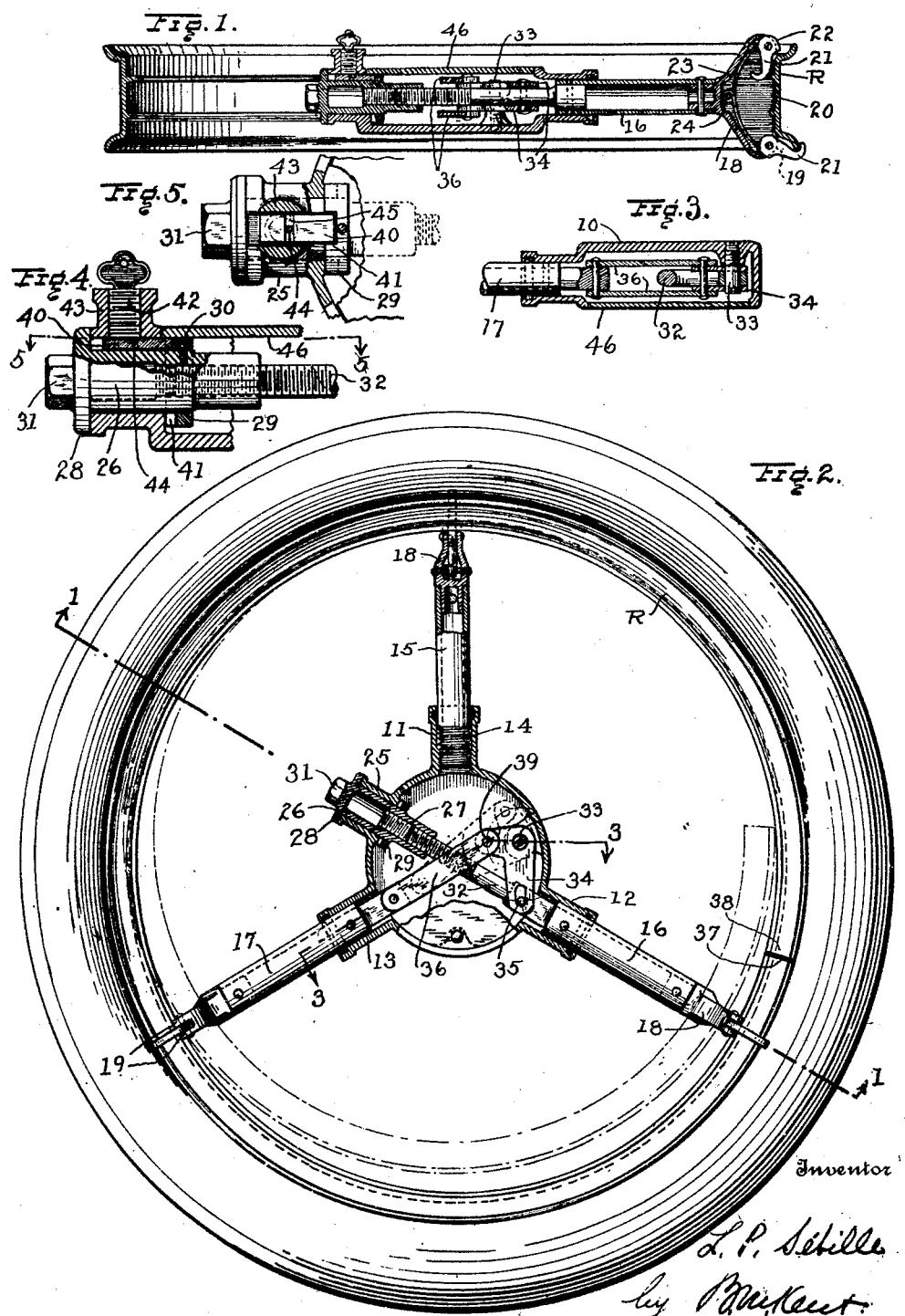

L. P. SEBILLE 1,543,682

TIRE CARRIER

Filed Aug. 22, 1921

Inventor
L. P. Sébille

By B. M. Kent

Attorney

Patented June 30, 1925.

1,543,682

UNITED STATES PATENT OFFICE.

LEO PAUL SÉBILLE, OF CLEVELAND, OHIO, ASSIGNOR OF ONE-HALF TO BERT M. KENT, OF CLEVELAND, OHIO.

TIRE CARRIER.

Application filed August 22, 1921. Serial No. 494,054.

*To all whom it may concern:*

Be it known that I, LEO PAUL SÉBILLE, a subject of the King of Belgium, and a resident of Cleveland, county of Cuyahoga, State of Ohio, have invented certain new and useful Improvements in Tire Carriers, of which the following is a specification.

This invention relates to devices for collapsing transversely split rims and also to spare tire carriers for motor vehicles combined with a rim collapsing device.

It is one of the objects of the invention to provide a simple, effective and conveniently operable rim-collapsing tool, and more especially one that is adapted to be carried on a motor vehicle and will be so constructed as to be adapted to collapse the various types of transversely split rims now on the market and also adapted to collapse rims of different sizes. A further object of the invention is to provide a substantial device, for the purpose set forth, which will be durable, and capable of withstanding the severe service to which such devices are subjected.

Other objects and the features of novelty will be apparent from the following description taken in connection with the accompanying drawings, of which:

Figure 1 is a transverse section of a device embodying my invention, the section being taken on the line 1—1 of Fig. 2;

Fig. 2 is a side elevation with parts shown in section, the tire also being included in this view;

Fig. 3 is a section on the line 3—3 of Fig. 2;

Fig. 4 is an enlarged fragment of Fig. 1;

Fig. 5 is a plan view of the parts shown in Fig. 4, a portion of this figure being on the line 5—5 of Fig. 4.

Figure 6:
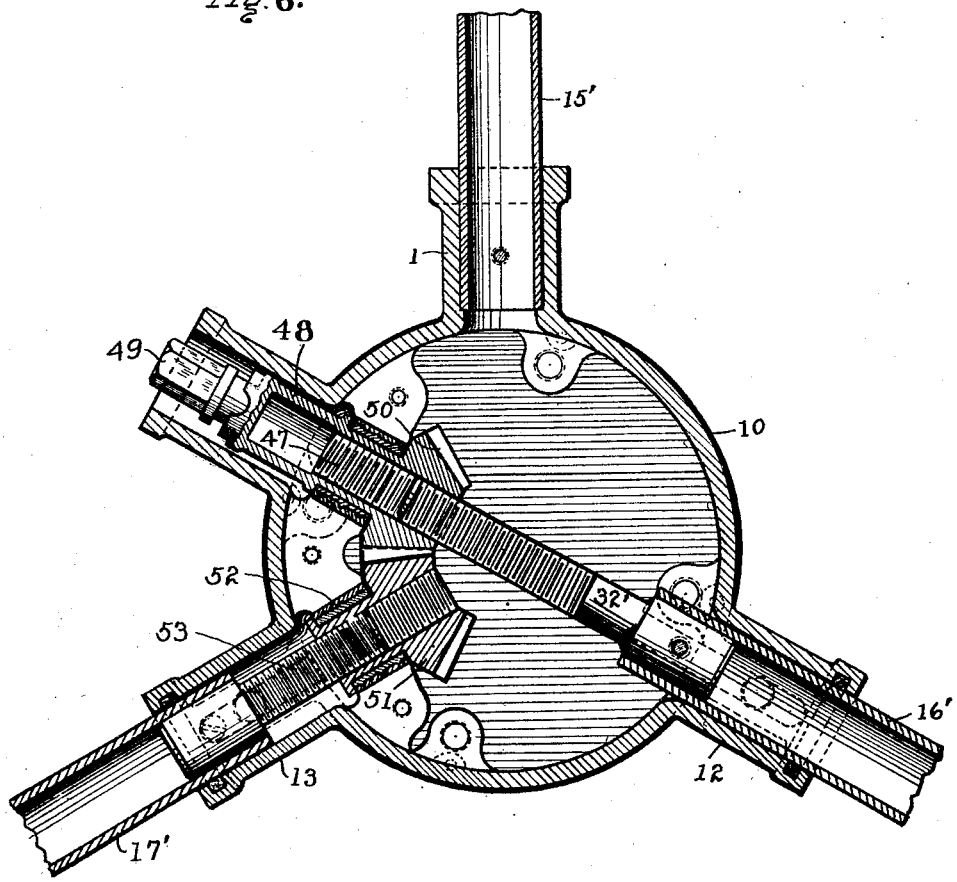
Fig. 6 is an enlarged fragmentary view similar to Fig. 2 but illustrating another form of the invention.

Referring to the drawings, 10 indicates a central hub or housing from which project the hollow radial arms 11, 12 and 13, these arms being preferably spaced equally about the hub 10. Secured in the arm 11, as by the screw threads 14, is a normally stationary extension 15, the threads 14 or any equivalent mechanism that may be preferred, being provided for the purpose of adjusting the extension 15 radially in order to accommodate rims of different diameters. Slidably mounted in the arms 12 and 13 are the extensions 16 and 17. Each of the extensions 15, 16 and 17 is provided at its outer end with a bracket 18 and these brackets cooperate to support the tire rim R. The brackets 18 are, by preference, made hollow and provided at their ends with pairs of ears 19 which project slightly beyond the rim engaging surface 20 of the bracket in order to prevent removal of the rim.

Between each pair of ears 19 there is pivoted a hook 21, the hooks on each bracket constituting a cooperating pair adapted to engage with the flanges of the rim. In Fig. 1, one of the hooks 21 is shown as engaging the flange of the rim and the opposite hook is housed within the bracket 18, the latter being the normal position of the hooks when the device is used simply as a tire carrier. When the device is to be used as a rim-collapsing tool all of the hooks are turned outward so as to engage with the flanges of the rim. From Fig. 1 it will be noted that the hub portion of each hook projects radially from its pivot slightly beyond the ears which carry the hook so as to provide a means adapted to be engaged by a person's thumb to swing the hook from its position within the bracket 18 to the operative position where it engages with the flange of the rim. This projection is indicated at the point 22 and it will be understood that all of the hooks are, by preference, constructed in this manner.

In order to yieldingly retain the hooks in the different positions to which they may be adjusted, and to prevent them from rattling when housed within the bracket 18 I have provided a spring 23 which is carried by a pin 24 and has its end portions in frictional engagement with the hub portions of the two hooks of the bracket. The springs 23 are so constructed as to exert sufficient pressure on the hooks to accomplish the purposes set forth.

A hollow boss 25 is formed on the hub 10 diametrically opposite the arm 12 and in this boss there is journalled a rotatable member 26 which is internally screw-threaded as indicated at 27 and is held from axial movement by the flange 28 and the collar 29, the latter being secured on the member 26 by set screws or pins as indicated at 30. The outer end of the member 26 is of polygonal form as indicated at 31 to receive a wrench for the purpose of rotating this member. The extension 16 carries a threaded rod 32 within the hub 10 and this rod engages the threaded portion 27 of the member 26 so that the extension 16 may be thereby moved radially in either direction by rotating the member 26.

A stud 33 is secured to the bottom of the hub 10, as best shown in Fig. 3, and has pivotally mounted thereon a pair of bell-crank levers 34 one end of which engages with the pivot pin 35 carried by the rod 32 so that these bell-crank levers will be actuated in accordance with the movements of the rod 32. The other ends of the levers 34 are pivotally connected thru a pair of links 36, arranged on opposite sides of the rod 32, with the extension 17 so that this extension will be moved radially in accordance with the movements of the extension 16. It will be noted that the arms of the bell-crank levers 34 that are connected with the rod 32 are considerably longer than the other arms that are connected with the extension 17 and, therefore, the movements of the extension 17 will be slower and of less extent than the corresponding movements of the extension 16.

In Fig. 2 the extensions 15, 16 and 17 are shown in the position in which they act as a spare tire carrier, the extensions 16 and 17 being forced outwardly against the interior of the rim to secure the latter. This is also the position of the extensions 16 and 17, at the start of the rim-collapsing operation and I have shown in broken lines on Fig. 2 the approximate shape of the rim and relation of its ends, when fully collapsed to permit the removal of the tire. In the collapsing movement it is necessary first to draw the end 37 radially inward relative to the end 38. The extension 15 being stationary it will be seen that inward movement of the extension 16, by rotation of the member 26, will draw this end 37 of the rim inward whereas inward movement of the extension 17 will produce an overlapping of the ends 37 and 38. It is, therefore, desirable to have the initial inward movement of the extension 16 accelerated relatively to the corresponding and simultaneous movement of the extension 17 or, in other words, it is desirable to have the inward movement of the extension 17 retarded relative to the corresponding inward movement of the extension 16 and this is effected in the construction illustrated in Figs. 1 to 5 by virtue of the direction of movement of the pivot 39, which connects the bell-crank levers 34 with the links 36, during the initial inward movement of the extension 16.

From Fig. 2 it will be noted that the movement of the pivot 39 from the position illustrated is, to a considerable extent, transverse of the line of movement of the extension 17 whereas the subsequent movement of the pivot 39 is more nearly in line with the radial movement of the extension 17. This relatively retarded initial movement of the extension 17 could be accentuated by bringing the ends of the bell-crank levers 34 closer together so that the inward movement of the pivot 39 would be more nearly at right angles to the radial movement of the extension 17.

In practice, I have found a movement of approximately 2" in the extension 16 and a corresponding movement of about 1⅛" in the extension 17 is ample for collapsing a rim sufficiently to make the removal of the tire therefrom relatively easy. In this collapsing movement the action of the extension 17 causes the rim to slide thru the hooks on the extension 16. The amount of adjustment necessary in the arm 15 will depend upon the number of different sizes of rims that it is desired to adapt the tool for but it will be noted that the position of the extension 15 does not in any way affect the extent of the movement of the arms 16 and 17.

When the device is used as a spare tire carrier it is advisable to have means for locking the extensions 16 and 17 in their extended positions in which they and the extension 15 forcibly engage the inner surface of the rim so as to securely grip the rim and prevent its removal. The locking means which I have provided consist of a bolt 40, which in practice I make of ¼" by ⅜" steel, that is slidable in a suitable keyway in the boss 25, into and out of notches 41 in the adjacent face of the collar 29. (See Figs. 4 and 5.) An ordinary Yale lock is indicated at 42 in a boss 43 projecting from the side of the boss 25 and the rotatable part of the lock 32 has an eccentric pin 44 which engages with a slot 45 in the bolt 40 to move the bolt into and out of the notches 41. From Fig. 5 it will be evident that when the bolt 40 is in one of the notches 41 the member 26 is effectively prevented from rotation although the lock 42 will not be subject to any strain when an attempt is made to rotate the member 26. The function of the lock is merely to shift the bolt 40 and the latter is the locking element that prevents rotation of the member 26 and thereby secures the extension 16 and 17 in their extended positions.

A cover plate 46 is secured in the open side of the hub 10 and prevents access to the internal mechanism.

In the form of the invention illustrated in Fig. 6 the hub 10 is essentially the same as in the construction previously described and has the hollow arms 11, 12 and 13. The extension 15' as shown is rigidly pinned in the arm 11 and is, therefore, non-adjustable. The extension 16' has a rod 32' secured thereto which engages with the internal threads 47 of the rotatable member 48. The latter has a polygonal projection 49 at its outer end adapted to receive a wrench and at its inner end is provided with a bevel gear 50 which meshes with a gear 51 that is mounted in a bearing 52 in the hub. The gear 51 has a threaded bore with which the threaded rod 53 on the arm 17' cooperates. The gears 50 and 51 may be of the same size and in that event, in order to provide for the differential movement between the extensions 16' and 17' I make the thread on the rod 32 of considerably coarser pitch than the thread of the rod 53.

It will be understood that the extensions 15', 16' and 17' may be provided with the brackets 18 and hooks 21 to engage with the rim the main difference between the two constructions, however, is in the internal mechanism for actuating the movable extensions. In case it is preferred to make the threads of the rods 32' and 53 of the same pitch a difference in the size of the gears 50 and 51 may be made in order to provide for the differential movement above referred to.

It will be understood that when the device is to be used on a motor vehicle suitable brackets will be provided for the purpose of securing the hub 10 to the vehicle but I have deemed an illustration of such brackets to be unnecessary to an understanding of the invention.

The hooks 21, being pivoted to the brackets 18 are adapted to assume different positions for the purpose of engaging rims of different widths. This feature taken with the adjustability of the arm 15 which adapts the device to rims of different diameters makes it possible to accommodate with the same device all of the commercial sizes of transplit rims. Further adjustability may be provided, if desired, by making one or both of the extensions 16 and 17 of adjustable length by providing threaded connections between the part 16 and the rod 32 and a similar device in the extension 17.

Having thus described my invention, what I claim is:

1. In a device of the class described, the combination of a hub having a plurality of radially projecting arms some of which are movable radially, means for actuating said radially movable arms, pivoted hooks on the outer ends of each of said arms adapted to take different positions to engage opposite sides of rims of different widths for the purpose of collapsing them, said arms having pockets at their outer ends to receive said hooks when not in use, and spring means in said pockets cooperating with said hooks to frictionally hold them in different operative positions.

2. In a device of the class described, the combination of a hub having a plurality of radially projecting arms some of which are movable radially, one of said movable arms having a threaded extension within said hub, a rotatable member in said hub held against axial movement and having threads cooperating with said extension whereby the latter and its arm may be moved radially by the rotation of said member, and means independent of said rotatable member operatively connecting said extension with another of said arms so as to actuate the latter thereby.

3. In a device of the class described, the combination of a hub having a plurality of radially projecting arms some of which are movable radially, one of said movable arms having a threaded extension within said hub, a rotatable member in said hub held against axial movement and having threads cooperating with said extension whereby the latter and its arm may be moved radially by the rotation of said member, means operatively connecting said extension with another of said arms so as to actuate the latter thereby, and lock controlled means on said hub for preventing rotation of said member.

4. In a device of the class described, the combination of a hub having a plurality of radially projecting arms some of which are movable radially, one of said movable arms having a threaded extension within said hub, a rotatable member in said hub held against axial movement and having threads cooperating with said extension whereby the latter and its arm may be moved radially by the rotation of said member, means operatively connecting said extension with another of said arms so as to actuate the latter thereby, a bolt carried by said hub and adapted to prevent rotation of said member, and a lock for actuating said bolt.

5. In a device of the class described, the combination of a hub having a plurality of radially projecting arms some of which are movable radially, a rotatable member in said hub held against axial movement and having threaded connection with one of said arms so as to move the latter radially in either direction, a lever pivoted in said hub and having one end in engagement with said movable arm so as to be actuated thereby, and means connecting the other end of said lever with another arm to actuate the latter.

6. In a device of the class described, the combination of a hub having a plurality of radially projecting arms some of which are movable radially, a rotatable member in said hub held against axial movement and having threaded connection with one of said arms so as to move the latter radially in either direction, a lever pivoted in said hub and having one end in engagement with said movable arm so as to be actuated thereby, and a link pivotally connected with the other end of said lever and with another of said radially movable arms to actuate the latter.

7. In a device of the class described, the combination of a hub having a plurality of radially projecting arms some of which are movable radially, a rotatable member in said hub held against axial movement and having threaded connection with one of said arms so as to move the latter radially in either direction, a lever pivoted in said hub and having one end in engagement with said movable arm so as to be actuated thereby, and a link pivotally connected with the other end of said lever and with another of said radially movable arms to actuate the latter, said lever being so proportioned as to cause said movable arms to be moved differentially.

8. In a device of the class described, the combination of a hub, a plurality of radially extending arms associated therewith, means at the ends of said arms adapted to engage a rim to collapse the same, and means for drawing some of said arms inwardly comprising a device whereby the movement of one of the arms is relatively retarded during the initial portion of the rim-collapsing operation.

9. In a device of the class described for collapsing transplit tire rims, the combination of a hub, a plurality of radially extending arms associated therewith, means at the ends of said arms adapted to engage a rim to collapse the same, the rim to be arranged thereon with the split thereof adjacent one of said arms, and means for drawing some of said arms inwardly including a device whereby the movement of an arm that is remote from the split of the rim is retarded, during the initial portion of the rim collapsing operation, relatively to that of said arm that is adjacent to the split of the rim.

10. In a device of the class described for collapsing transplit tire rims, the combination of a hub, a plurality of radially extending arms associated therewith, one of said arms being relatively stationary and two being movable radially, means at the ends of said arms adapted to engage a rim to collapse the same, the rim to be arranged thereon with the split thereof adjacent one of said movable arms, and means for actuating said movable arms including a device whereby the movement of the said movable arm that is remote from the split of the rim is retarded, during the initial portion of the rim collapsing operation, relatively to that of the arm that is adjacent to the split of the rim.

In testimony whereof I affix my signature.

LEO PAUL SÉBILLE.